July 1, 1930. V. G. APPLE 1,768,654
METHOD OF MAKING COMMUTATORS
Filed Nov. 21, 1928
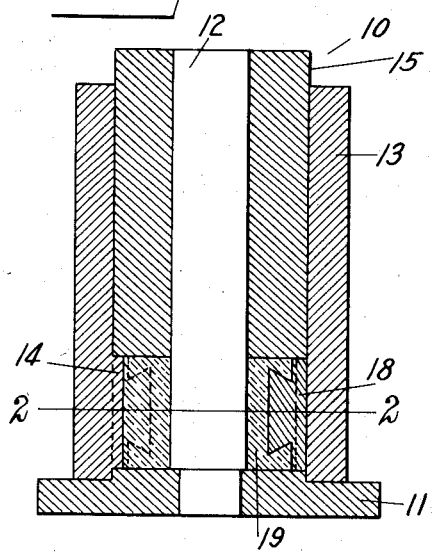
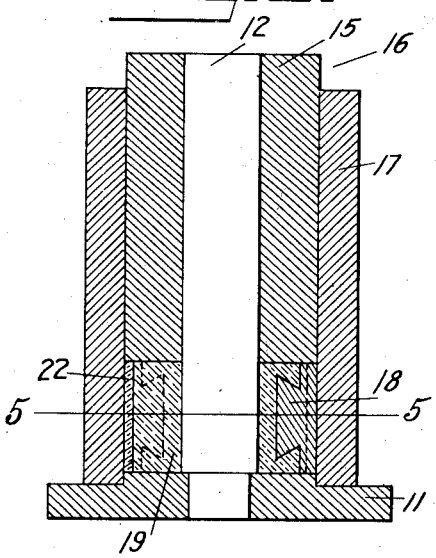
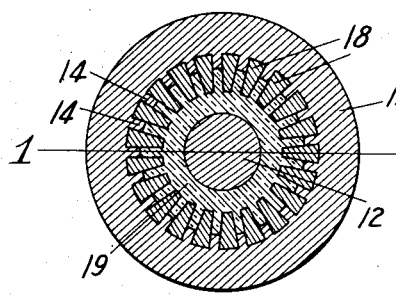
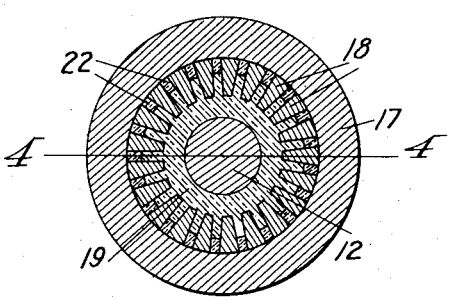
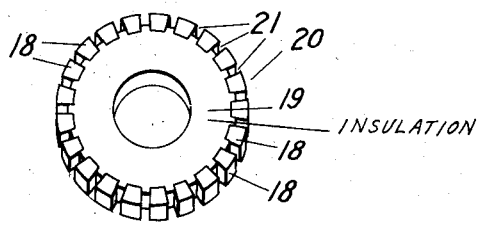
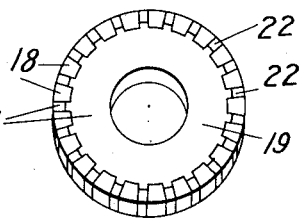
INVENTOR.

Patented July 1, 1930

1,768,654

UNITED STATES PATENT OFFICE

VINCENT G. APPLE, OF DAYTON, OHIO

METHOD OF MAKING COMMUTATORS

Application filed November 21, 1928. Serial No. 320,903.

This invention relates to commutators, and particularly to commutators comprising a plurality of segments of material of high electrical conductivity bound together by a core of insulating material molded in situ between and about them.

To provide commutators of this class suitable for high rotative speed, the core material must possess considerable mechanical as well as dielectric strength, and a certain class of phenol-resin molding compounds meet this requirement and are therefore most often used for the purpose.

But when cores used from these strong materials extend outwardly between the metal segments and form part of the brush track of the commutator, difficulty is encountered, since these materials do not make a good brush track because arcing of the brushes converts them to carbon which is a conductor.

To overcome this objection commutators of this class are usually either undercut, i. e. the core material is cut from between the segments at the brush track, or spacers of sheet insulating material more nearly suited to a brush track are placed between the segments near the periphery of the commutator, and the core is then molded to extend outwardly between the segments until met and excluded by these spacers.

It is therefore an object of this invention to provide a method of procedure which will produce a commutator, in which the foregoing objections are not present, with minimum expenditure of labor and material.

I attain this object by the procedure and the resulting structure hereinafter described and shown in the accompanying drawings wherein—

Fig. 1 is a longitudinal cross section taken at 1—1 of Fig. 2 thru a mold wherein the core material is placed.

Fig. 2 is a transverse section thru the mold taken at 2—2 of Fig. 1.

Fig. 3 shows a commutator as it appears when removed from mold Figs. 1 and 2.

Fig. 4 is a longitudinal cross section taken at 4—4 of Fig. 5 thru a second mold used as part of my method.

Fig. 5 is a transverse section taken at 5—5 of Fig. 4.

Fig. 6 is a completed commutator.

Similar numerals refer to similar parts thruout the several views.

To carry out my invention I provide a mold 10 comprising a base 11 carrying a central stud 12, a cylinder 13 concentrically supported on base 11 and having inwardly extending spacers 14, and a plunger 15 slidable within cylinder 13 and over stud 12.

I also provide a second mold 16, the parts of which may be identical with those of mold 10 except that in the cylinder 17 the spacers 14 are omitted.

With plunger 15 removed I assemble a plurality of commutator segments 18 into cylinder 13 between spacers 14, place a quantity of moldable compound of the strong but carbonizing variety into cylinder 13, return plunger 15 and force it downward to compact the insulation and form the core 19 which extends outwardly between segments 18 as far as spacers 14 will permit. The insulation is then hardened and the commutator removed.

A commutator 20 removed from the mold 10 appears as in Fig. 3 where core 19 holds the segments 18 in proper relation with spacers 21 between the segments at the periphery of the commutator.

The commutator 20 is what is commonly known as an undercut commutator, and there are many instances where such a commutator is desirable, but there are also other instances where it is better not to have these open spaces between segments and in such cases I place the commutator 20 in the mold 16 Fig. 4, with a quantity of non-carbonizing insulation, such as silica of soda, gyptol, or the like, under plunger 15 and compress it to fill the spaces 21 with the non-carbonizing insulation 22.

Fig. 6 shows a commutator made according to my invention where the core 19 is of one kind of insulation and the spacers 22 of another, each kind best suited to the purpose for which it is used, and each placed with minimum labor and without waste of material.

Having described my invention, I claim—

A method of making a commutator which consists of holding the segments in spaced relation in a mold by means of partitions extending from the outer wall of said mold radially inward a short distance between adjacent segments, molding insulating material of great strength but unsuitable for a brush track about the ends of said segments and extending therebetween as far as said partitions permit, removing said mold and substituting therefor a similar mold but without said partitions and molding another kind of insulation more suitable for a brush track into spaces left by said partitions.

In testimony whereof I hereunto set my hand.

VINCENT G. APPLE.